Aug. 19, 1941.  F. P. GRIFFIN  2,253,121
WIRE HANDLING IMPLEMENT
Filed April 27, 1940  2 Sheets-Sheet 1
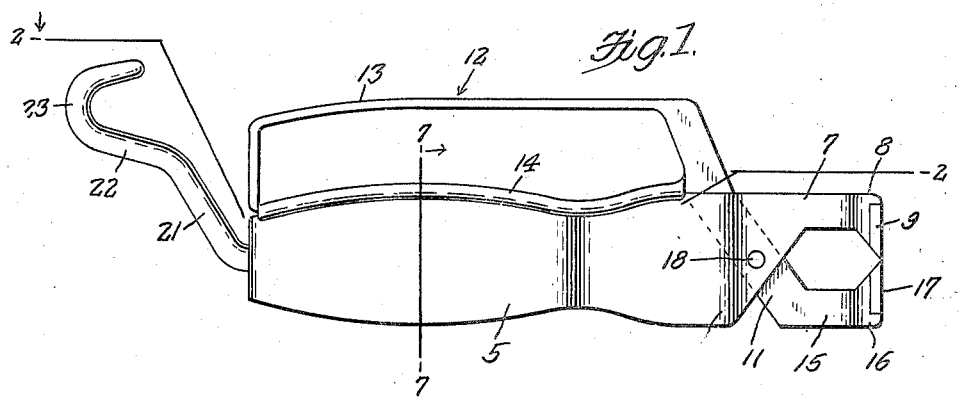
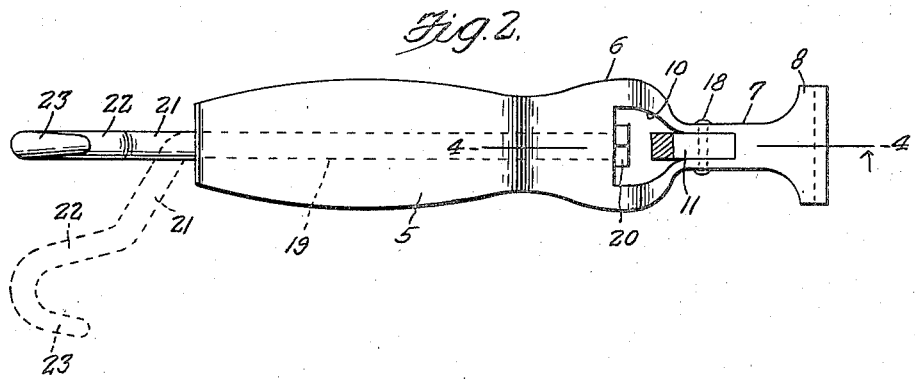
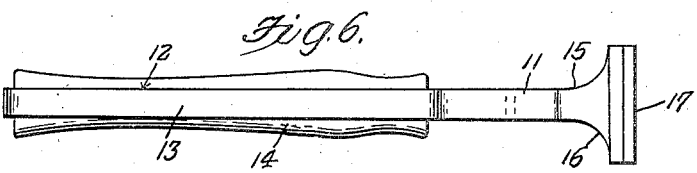
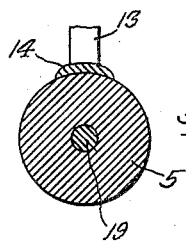
Inventor
Floyd P. Griffin
By Clarence A. O'Brien
Attorney

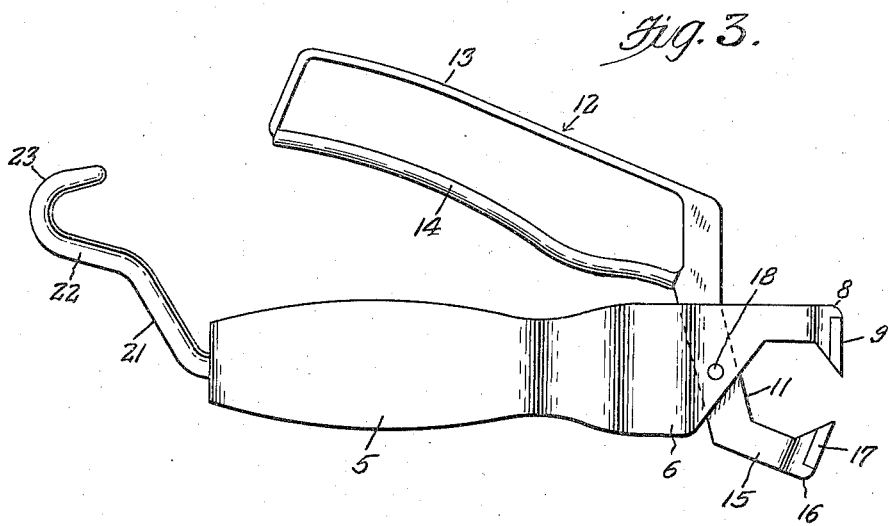
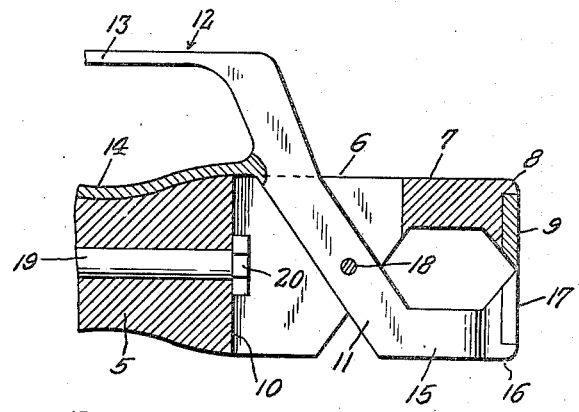
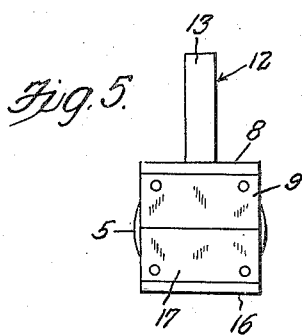

Patented Aug. 19, 1941

2,253,121

UNITED STATES PATENT OFFICE 2,253,121

WIRE HANDLING IMPLEMENT

Floyd P. Griffin, Clifton, Tex.

Application April 27, 1940, Serial No. 332,091

2 Claims. (Cl. 140—121)

This invention appertains to new and useful improvements in implements for tieing and cutting wire.

The principal object of the present invention is to provide an implement which is useful for general work in handling wire, such as tieing and cutting the same.

Another important object of the invention is to provide an implement of the character stated which is of simple construction yet positive acting in operation.

These and other objects and advantages of the invention will become apparent to the reader of the following specification.

In the drawings—

Figure 1 represents a side elevational view.

Figure 2 is a section on the line 2—2 of Figure 1.

Figure 3 is a side elevational view of the implement in opened position.

Figure 4 is a fragmentary detailed sectional view taken substantially on the line 4—4 of Figure 2.

Figure 5 is an end elevational view of the implement.

Figure 6 is a top plan view of the handle and cutter movable unit.

Figure 7 is a section on the line 7—7 of Figure 1.

Referring to the drawings wherein like numerals designate like parts, it can be seen that numeral 5 represents an elongated handle having a head structure 6 and being generally formed to fit the grip of a hand.

The handle 5 is provided with a reduced extension 7 merging in a T-formation 8 to which is suitably attached and preferably detachably so, a blade 9.

The head 6 has an opening 10 therein which extends partly into the narrow neck extension 7 and through this extends the oblique leg member 11 projecting from the handle structure 12. This handle 12 has the back guard 13 and the grip plate 14, the grip plate 14 following the conformation of the handle 5.

The leg 11 has the forward extending foot portion 15 terminating in a T-formation 16 to which a blade 17 is detachably secured and in cooperative relation to the cutter blade 9. A pivot pin 18 is disposed through the head 6 and through the intermediate portion of the leg 11 to pivotally connect the handle cutter unit 12—17 to the handle cutter unit 5—9.

A rod 19 extends through a bore in the handle 5 and is rotatable. This rod extends from one end of the handle to terminate within the opening 10 of the head 6, where it is threaded and equipped with a nut 20.

The other end of the rod 9 is provided with a wire tieing hook which consists of the obliquely disposed portion 21 merging with an offset portion 22, the latter merging with an outboard disposed hook 23. Obviously, this tieing hook 23 can be used for tieing wire after which the surplus ends can be nipped off through the use of the cutter blades 9 and 17.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. An implement of the character described comprising a handle having a transverse opening adjacent one end thereof, a jaw extending from said end of the handle, a second handle operative adjacent the first-mentioned handle and having a leg member disposed through the transverse opening, a pivotal connection between the leg and the first-mentioned handle at the transverse opening, and a jaw on the leg cooperative with the jaw on the first-mentioned handle.

2. An implement of the character described comprising an elongated handle structure having a reduced jaw formation at one end thereof, said handle structure having a transverse opening therethrough at the point where the jaw formation merges with the handle, a frame-like handle structure having one side portion shaped to conform with the shape of the first mentioned handle and having an oblique leg portion at one end thereof disposed through the opening, a jaw extending from the oblique leg to a position complementary to the first mentioned jaw and a pivot pin disposed through the handle structure and leg to rockably support the said leg in the transverse opening of the handle structure.

FLOYD P. GRIFFIN.